(12) United States Patent
Larsson et al.

(10) Patent No.: US 12,291,450 B2
(45) Date of Patent: May 6, 2025

(54) PURE IRON CONTAINING COMPOUND

(71) Applicant: Höganäs AB (Publ), Höganäs (SE)

(72) Inventors: Per-Olof Larsson, Helsingborg (SE);
Björn Skårman, Höganäs (SE);
Hilmar Vidarsson, Höganäs (SE)

(73) Assignee: HÖGANÄS AB (PUBL), Höganäs (SE)

( * ) Notice: Subject to any disclaimer, the term of this patent is extended or adjusted under 35 U.S.C. 154(b) by 815 days.

(21) Appl. No.: 17/298,686

(22) PCT Filed: Dec. 3, 2019

(86) PCT No.: PCT/EP2019/083424
§ 371 (c)(1),
(2) Date: Jun. 1, 2021

(87) PCT Pub. No.: WO2020/126456
PCT Pub. Date: Jun. 25, 2020

(65) Prior Publication Data
US 2022/0041449 A1 Feb. 10, 2022

(30) Foreign Application Priority Data

Dec. 21, 2018 (EP) .................................. 18215706

(51) Int. Cl.
*C01B 25/45* (2006.01)
*B01D 21/00* (2006.01)
(Continued)

(52) U.S. Cl.
CPC .............. *C01B 25/45* (2013.01); *C01G 49/00* (2013.01); *B01D 21/0012* (2013.01);
(Continued)

(58) Field of Classification Search
None
See application file for complete search history.

(56) References Cited

U.S. PATENT DOCUMENTS

| 4,693,864 A | 9/1987 | Lloyd |
| 2009/0095132 A1 | 4/2009 | Winter |

(Continued)

FOREIGN PATENT DOCUMENTS

| CA | 704064 A | 2/1965 |
| CN | 101223293 A | 7/2008 |

(Continued)

OTHER PUBLICATIONS

Adcock, F., et al. Iron of High Purity. Proceedings of the Royal Society of London. Series A, Mathematical and Physical Sciences, vol. 153, No. 878, 172-200 (1935). (Year: 1935).*

(Continued)

*Primary Examiner* — Anthony J Zimmer
*Assistant Examiner* — Zachary John Baum
(74) *Attorney, Agent, or Firm* — Boone IP Law

(57) ABSTRACT

The present invention relates to a method of producing an iron containing compound, iron containing precursor, or iron containing aqueous solution comprising the steps of:
  providing direct reduced iron;
  dissolving the direct reduced iron in organic and/or inorganic acids to provide an iron containing aqueous solution, wherein insoluble impurities of the direct reduced iron are maintained in solid form throughout the dissolution process, to obtain an iron containing aqueous solution with suspended insoluble impurities;
  separating the said insoluble impurities from the iron containing aqueous solution obtaining a purified iron containing aqueous solution; and
  optionally solidifying said purified iron containing aqueous solution to provide the iron containing compound or iron containing precursor, by drying.

(Continued)

The present invention further relates to iron containing compounds, iron containing precursors, and iron containing aqueous solutions, and their use in battery components.

26 Claims, 1 Drawing Sheet

(51) Int. Cl.
  *B01D 21/26* (2006.01)
  *C01G 49/00* (2006.01)
(52) U.S. Cl.
  CPC ........ *B01D 21/0027* (2013.01); *B01D 21/262* (2013.01); *C01P 2006/40* (2013.01); *C01P 2006/80* (2013.01)

(56) References Cited

U.S. PATENT DOCUMENTS

| | | | |
|---|---|---|---|
| 2011/0068295 A1 | 3/2011 | Beck et al. | |
| 2012/0032119 A1 | 2/2012 | Tahara et al. | |
| 2012/0085968 A1* | 4/2012 | Kawakami | C01B 25/45 252/182.1 |
| 2012/0292560 A1* | 11/2012 | Tahara | C01B 25/45 252/182.1 |
| 2014/0127111 A1 | 5/2014 | Tahara | |

FOREIGN PATENT DOCUMENTS

| | | | | |
|---|---|---|---|---|
| CN | 102252883 A | * | 11/2011 | |
| CN | 102348634 A | | 2/2012 | |
| CN | 102557152 A | | 7/2012 | |
| CN | 102695760 A | | 9/2012 | |
| CN | 104817059 A | * | 8/2015 | |
| CN | 104907570 A | * | 9/2015 | |
| CN | 106876705 A | * | 6/2017 | ........... H01M 4/366 |
| CN | 108101014 A | | 6/2018 | |
| CN | 108609595 A | * | 10/2018 | ........... C01B 25/375 |
| JP | 2012-057234 A | | 3/2012 | |
| JP | 2013-510069 A | | 3/2013 | |
| WO | 2011-057646 A1 | | 5/2011 | |
| WO | 2011-086872 A1 | | 7/2011 | |
| WO | 2012172839 A1 | | 12/2012 | |
| WO | 2018217739 A1 | | 11/2018 | |

OTHER PUBLICATIONS

Buck, W. and Leidheiser, H. The corrosion of single crystals and recrystallized single crystals of iron and steel in citric acid. J. Electrochem. Soc. 104, 474 (1957) (Year: 1957).*
Patil, D. and Sharma, A. Study on the corrosion kinetics of iron in acid and base medium. E-Journal of Chemistry 2011, 8(S1), S358-S362. (Year: 2011).*
English translation of CN-104817059-A Description (Year: 2015).*
English translation of CN-108609595-A Description (Year: 2018).*
English translation of CN-104907570-A Description (Year: 2015).*
English translation of CN-106876705-A Description (Year: 2017).*
English translation of CN-102252883-A Description. (Year: 2011).*
Notice of Reasons for Refusal in corresponding Japanese Application No. JP 2021-535720, mailed on Dec. 12, 2023, with English translation, 10 pages.
Takata, Quantification of impurity element in a single, high-purity, determination of high-purity iron, Filling-up, Japan, 1994, vol. 33, No. 1, p. 84-87, 4 pages. (Relevance via Notice of Reasons for Refusal).
Office Action (First Office Action) issued on Dec. 27, 2022, by the State Intellectual Property Office of the People's Republic of China in corresponding Chinese Patent Application No. 201980085217.8, and an English Translation of the Office Action. (13 pages).
Frank Adcock et al., "Iron of High Purity," Proceedings of the royal Society of London, Series A, Mathematical and Physical Sciences, Dec. 2, 1935, vol. 153, No. 878, pp. 172-200, XP055589927.
International Search Report (PCT/ISA/210) and Written Opinion (PCT/ISA/237) mailed on Jan. 8, 2020, by the European Patent Office as the International Searching Authority for International Application No. PCT/EP2019/083424.
J.S. Chen et al., "Trace analysis of high-purity iron by total reflection X-ray fluorescence spectrometry," Fresenius' Journal of Analytical Chemistry, Jan. 1, 1990, vol. 338, No. 8, pp. 891-894, XP044489701, Springer-Verlag, Germany.
P. Mühl et al., "The Preparation of High Purity Iron Compounds by Solvent Extraction with Aliphatic Monocarboxylic Acids," Hydrometallurgy, Jan. 1, 1975, pp. 113-121, XP055589430, Elsevier Scientific Publishing Company, Amsterdam, The Netherlands.

* cited by examiner

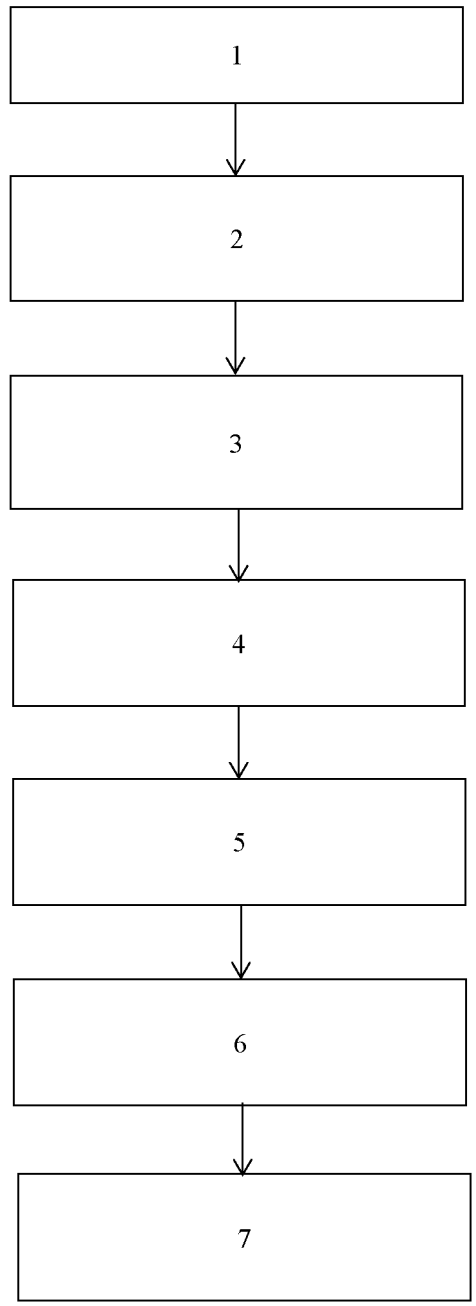

PURE IRON CONTAINING COMPOUND

FIELD OF THE INVENTION

The present invention relates to a method of producing an iron containing compound, iron containing precursor, or iron containing aqueous solution, and its use in iron-containing electrode material production.

BACKGROUND

Iron is the fourth most common element in the crust of the earth, present commonly in the form of oxides, sulfides, or silicates.

The metal iron has been, and still is, of paramount importance for the technological development of mankind due to its abundant presence and relatively easiness to be reduced into metallic iron, In the modern advanced technology, iron is an important element, present e.g. in various electrical equipment, batteries, fuel cells etc. Iron may be used as a component in electrodes such as anodes or cathodes. One specific example of use is in cathodes, e.g. cathode material in lithium ion batteries, such as lithium iron phosphate cathodes, also called LFP-cathodes. Since iron is a relatively inexpensive material, cathode materials containing iron would be a very promising route for the development of lithium-ion batteries. Lithium iron containing batteries are increasing on the market due to their good performances. However, in order to be effectively utilized in such application, iron must be present in very pure state, i.e. the amount of impurities must be extremely low. The today present methods for producing high purity iron such as electrolytic precipitation, various purification methods in gas phase etc. are relatively costly. The manufacture methods may include many complex steps which may be both time consuming and highly influencing the economy of the production to provide the desired purity of the battery materials. Conventionally, iron based cathode materials may be provided from iron chlorides or iron sulfates which may be precipitated to iron phosphates. However, the impurities formed during the process need to be removed but is costly to do and requires many washing steps in order to finally obtain a pure enough material for battery production.

Thus, there is a need for an inexpensive method for producing high purity iron, and iron containing compounds, such as precursors for the production of LFP-cathodes, starting from an inexpensive iron material containing relatively high levels of impurities.

SUMMARY

The present invention provides a way to use easily accessible raw materials, and at a reasonable cost provide iron-based battery supply material with high purity, through a dissolution and separation process.

The present invention provides iron containing compounds and solutions of high purity from relatively inexpensive starting material containing impurities, which with the state of the art methods are relatively complex and costly to provide. In addition, the present invention provides also high purity iron containing precursors for e.g. LFP, as well as LFP-cathodes made from said precursors. The cathodes may apart from the LFP also contain carbon black, binders, different active materials, etc.

SHORT DESCRIPTION OF THE DRAWINGS

FIG. 1 shows a schematic drawing of a manufacturing process according to the present invention.

DETAILED DESCRIPTION

Reduction of Iron Ore into Metallic Iron

The iron ore used for making direct reduced iron is normally subjected to a crushing step and separation process, e.g. magnetic separation, in order to remove unwanted minerals. Still, however the crushed and processed iron ore contains impurities.

Feed material of the present process includes direct reduced iron which is produced by direct reduction of iron ore or other iron bearing materials in solid state to iron by a reducing gas or elemental carbon. Direct reduced iron (DRI) is also known as sponge iron. The iron ore may be in the form of lumps, pellets or fines. The iron ore is heated in a furnace at high temperatures (e.g. about 800 to 1200° C.) in the presence of e.g. hydrogen, hydrocarbon-rich gases, carbon monoxide, or elemental carbon. Direct reduction is the removal of oxygen from iron ore or other iron bearing materials in the solid state, i.e. it refers to reduction of the iron oxides present in the iron ore to metallic iron at high temperatures but below the melting point of iron. The iron material formed during direct reduction provides a sponge-like, perforated, or hollow material. The chemical reactions involved in the direct reduction of iron are the following:

with $H_2$ $$3Fe_2O_3 + H_2 \rightarrow 2Fe_3O_4 + H_2O$$

$$Fe_3O_4 + H_2 \rightarrow 3\,FeO + H_2O$$

$$FeO + H_2 \rightarrow Fe + H_2O$$

with CO $$3Fe_2O_3 + CO \rightarrow 2Fe_3O_4 + CO$$

$$Fe_3O_4 + CO \rightarrow 3\,FeO + CO_2$$

$$FeO + CO \rightarrow Fe + CO_2$$

with solid carbon in reaction $$CO_2 + C \rightarrow 2CO$$

It is to be noted that the direct reduced iron contains iron oxides as impurities. Further, impurities may e.g. be selected from nitrides, sulfides, carbides.

One object of the present invention is to provide a

A method of producing an iron containing compound, iron containing precursor, or iron containing aqueous solution comprising the steps of:
  providing direct reduced iron;
  dissolving the direct reduced iron in organic and/or inorganic acids to provide an iron containing aqueous solution, wherein insoluble impurities of the direct reduced iron are maintained in solid form throughout the dissolution process, to obtain an iron containing aqueous solution with suspended insoluble impurities;
  separating the said insoluble impurities from the iron containing aqueous solution obtaining a purified iron containing aqueous solution; and
  optionally solidifying said purified iron containing aqueous solution to provide the iron containing compound or iron containing precursor, by drying, e.g. in order to remove solvent present in said purified iron containing aqueous solution.

The purified iron containing aqueous solution may be essentially free from insoluble impurities.

Iron Ore

Without being bound to any theory it is believed that the solid state reduction of iron ore will transfer strong oxide forming elements, present in the iron oxide lattice, into discrete inclusions inside the reduced iron or on the surface of the particles thereof. The so called gangue elements will thus form discrete particulates of e.g. oxides, silicates, aluminates, sulfides, nitrides, carbides, etc. that cannot be reduced to metallic elements during the reduction process at the temperature used during the solid state reduction.

The impurities in direct reduced iron may be categorized into the following groups:
1—Iron oxides and iron carbides. These impurities originate commonly from the manufacturing process of metallic iron. In the present process the iron oxides are often sparingly soluble, and the iron carbides are insoluble. Thus, the oxides may during the present process be dissolved while the carbides are found with insoluble impurities.
2—Spinets and/or perovskites containing e.g. iron or other metals such as nickel, cobalt, copper, etc. In the present process spinels and perovskites impurities are insoluble.
3—Impurities containing stronger oxide formers than iron. In the present process these impurities are insoluble.
4—Impurities containing metals more electronegative than iron. In the present process these impurities are soluble, and may be found in the aqueous phase after the present dissolution process.

The direct reduced iron may be provided as particles, such as a powder, i.e. particles of a rather small particle size.

It is to be noted that the direct reduced iron preferably have been reduced by hydrogen gas, hydrocarbon gases, carbon, or any combination thereof. Chemical reactions thereof have been disclosed previously herein. It is preferable not to use calcium, magnesium or silicon as reducing agents. As mentioned above, it is believed that the direct reduced iron used herein has its impurities not dissolved throughout the iron matrix but being present as clusters in the structure. Thus, upon dissolution of the iron containing material, the impurity clusters will be kept together as solids and may be separated from the iron containing solution.

The insoluble impurities present in the direct reduced iron, are provided as particulate matter in the dissolved iron containing aqueous solution before a separation is made. It is to be noted that very fine particulate matter may be present in the aqueous solution also after any separation, as there are limitations to how small particles are able to be removed in conventional separation processes in terms of costs and equipment limitations. Examples of such particles are colloidal particles. The insoluble impurities may comprise compounds being selected from oxides, such as iron oxides; carbides, such as iron carbides; nitrides; sulfides, such as $CuS$, $Bi_2S_3$, $CdS$, $PbS$, $HgS$, $As_2S_3$, $Sb_2S_3$, and $SnS_2$; silicates; aluminates; spinels, e.g. containing iron; perskovites, e.g. containing iron; impurities containing stronger oxide formers than iron, i.e. compounds containing stronger oxide formers than iron, such as aluminium; metals more electronegative than iron, such as compounds comprising nickel, copper, cobalt, lead, silver, platinum, and gold; and any combination thereof.

The insoluble impurities are preferably made from compounds including metals and/or semi-metals, alone or in combination with non-metals, e.g. as salts. The content of insoluble impurities in the present iron containing compound, iron containing precursor, or iron containing aqueous solution is based on the total metal and semi-metal content therein, which metals and semi-metals originates from the direct reduced iron.

The insoluble impurities may preferably be selected from oxides, and/or carbides. Such may e.g. include iron oxides and/or carbides obtained from the manufacturing process as stated above.

The insoluble impurities may comprise aluminium, arsenic, bismuth, calcium, chromium, iron, lead, magnesium, manganese, molybdenum, selenium, niobium, antimony, silicon, tantalum, titanium, tungsten, vanadium, zinc, zirconium, carbon, nitrogen, oxygen, phosphorous, sulfur, or any combination thereof. Insoluble iron containing compounds may as mentioned above be selected from iron containing carbides; sulfides; aluminates, such as spinels thereof; silicates, insoluble oxides, such as perovskites thereof.

Dissolution of Metallic Iron

During the dissolution of the direct reduced iron, the small discrete particles of the insoluble impurities will be released from the iron. Provided that the iron is transformed to soluble iron ionic species, these particulate impurities can be separated from the iron containing solution.

As a consequence of this, the iron ore used for the production of the direct reduced iron source must maintain low levels of contaminants of group 4 of the list described previously, e.g. low levels of the transition metals such as Ni, Cu, Co, and low levels of noble metals. These metals are more electronegative than iron and do not form particulate species during the reduction process and hence are not easily removed by separation.

The soluble iron ionic species in the iron containing solution can consist of ferrous or ferric ion species and complexes thereof. These complexes may have different configuration depending of acid used for the dissolution process or other additives used.

The organic acids for the dissolution may be selected from compounds such as citric acid, formic acid, acetic acid, propionic acid, oxalic acid, benzoic acid, glycolic acid, lactic acid, malic acid, tartaric acid, and any combination thereof. Preferably, citric acid, acetic acid, and any combination thereof, are used as the organic acids for the dissolution.

The inorganic acids for the dissolution may be selected from compounds such as hydrochloric acid, chloric acid, perchloric acid, sulfuric acid, sulfurous acid, nitric acid, nitrous acid, phosphoric acid, and any combination thereof. Preferably, phosphoric acid, nitric acid, and any combination thereof, are used as the inorganic acids for the dissolution.

The pH of the iron containing solution after dissolution may be at most 4.5, such as at most 4.2, at most 4.0, or at most 3.8.

The direct reduced iron may be brought in contact with the organic and/or inorganic acids for the dissolution for a time period of about 30 minutes to 5 hours, such as 1~4 hours, 1-3 hours, or 1-2 hours.

The temperature during the dissolution step may be about 25-100° C., such as 30-80° C., 30-70° C., 30-65° C., or 40-55° C.

Oxygen may be provided to the dissolution step to facilitate the oxidation of metallic iron to soluble ferrous or ferric ions. The oxygen provided may be molecular oxygen or ozone. The oxygen may be provided to the process as air, ozone, oxygen gas, or any combination thereof, e.g. by purging with air, ozone, and/or oxygen gas. The oxygen may be supplied continuously or intermittently, preferably continuously. The oxygen assists and improves the dissolution step.

An oxidizing agent may be added to said dissolution step. This may be done in addition to provision of air, ozone and/or oxygen gas to the dissolution. Hydrogen peroxide may be added as oxidizing agent to said dissolution step. The addition of oxidizing agent, such as hydrogen peroxide, may be made as single dosage addition, intermittent addition or continuous addition.

Process Optimization

While the dissolution rate increases with temperature to a certain level, insoluble iron based species may form and cause passivation of the surfaces of the iron, and thus cause a termination of the dissolution.

It was surprising to find the dissolved gases present being found to have a crucial influence on the dissolution rate and the nature of the dissolved iron species. Specifically, introducing oxygen, such as molecular oxygen, into the solution both greatly increases the dissolution rate as well as the solubility of the iron species formed. Without being bound by any theory, it is believed that the oxygen participates in the dissolution reaction, forming stable water soluble iron-oxo complexes.

The oxygen can be introduced by vigorous air bubbling, or by introducing oxygen and/or ozone.

Another important specie that influences the dissolution process is hydrogen peroxide. Adding this to the solution during the dissolution process causes an increase in the dissolution rate.

The dissolution step may be provided with means of temperature control. This may be made to facilitate a stable dissolution as the dissolution of iron is exothermic and unwanted side reaction is preferably to be avoided. A cooling device may be used to remove excess heat from the dissolution process.

Separation

Upon the finalization of the dissolution reaction of the direct reduced iron, the resulting solution shall be subject a separation stage, where the undissolved particulate impurities are removed.

The separation may be performed using decanting, sedimentation, filtration, centrifugation, floatation, or any combination thereof. The separation may be performed using a decanter, a centrifuge, a filter device such as a filterpress or suction filter, or any combination thereof. Examples of such separation processes are sedimentation or centrifugation followed by decantation, and/or filtration, optionally facilitated by suction, etc. It is possible to add suitable clarifying agents before the separation to allow the particulate matter to aggregate and thereby facilitate the separation by the coarser matter formed.

The purified iron containing aqueous solution, iron containing compound, or iron containing precursor provided after the separation is considered to be of a high purity. By high purity of the iron containing aqueous solution is herein meant an iron content of at least 90%, such as at least 93%, at least 97.5%, at least 99%, at least 99.5%, or at least 99.9%, based on total metal and semi-metal content therein, which metals and semi-metals originates from the direct reduced iron. The iron content is mainly based on dissolved metal and semi-metal content therein, originating from the direct reduced iron. However, as mentioned previously, due to limitations in separation processes, very fine particulate matter, such as e.g. colloidal particles, may be present in the purified iron containing aqueous solution and any such fines may be then measured as if dissolved in the solution. The iron containing compound, or iron containing precursor may also have an iron content of at least 90%, such as at least 93%, at least 97.5%, at least 99%, at least 99.5%, or at least 99.9%, based on total metal and semi-metal content therein, originating from the direct reduced iron. The iron content here is not including any iron originating from water, acids, or any added carbon, oxygen, hydrogen. The iron content here is also not including any iron originating from phosphorous, and/or any iron originating from lithium which may be added during the process for the production of battery grade materials, e.g. Li-ion cathode battery materials.

The purified iron containing aqueous solution may be considered essentially free from insoluble impurities. The purified iron containing aqueous solution, iron containing compound, or iron containing precursor provided may contain insoluble impurities in an amount of 1000 ppm, such as 800 ppm, 600 ppm, 400 ppm, or 300 ppm, which impurities originates from the direct reduced iron. The content of insoluble impurities may be based on the total metal and semi-metal content therein originating from the direct reduced iron.

Prewashing

Washing

The direct reduced iron may prior to the dissolution step be subjected to a washing step, wherein soluble and/or dispersible surface impurities of the direct reduced iron are dissolved and/or suspended, and removed. The washing step makes soluble and/or dispersible surface impurities, present on the direct reduced iron particles, to become dissolved and/or suspended, and thus become removable with the washing fluid used. Impurities present on the surface of the direct reduced iron is believed to a large extent to be calcium and silicon containing. The calcium containing impurities may be water-soluble or soluble under acidic conditions. By performing the washing step, impurities on the surface of the iron containing particles may be removed. Thus, the content of impurities may be lowered before the dissolution step. The washing step may include subjecting the direct reduced iron to a dilute acid, such as a dilute organic and/or inorganic acid. The dilute organic acids for the washing may be selected from the group consisting of citric acid, formic acid, acetic acid, propionic acid, oxalic acid, benzoic acid, glycolic acid, lactic acid, malic acid, tartaric acid, and any combination thereof. The dilute inorganic acids for the washing may be selected from the group consisting of hydrochloric acid, chloric acid, perchloric acid, sulfuric acid, sulfurous acid, nitric acid, nitrous acid, phosphoric acid, and any combination thereof. Preferably, dilute phosphoric acid and/or citric acid in diluted form is used for the washing step. The dilute acid provided may have a concentration of 1-25 wt %, such as 1-20 wt %, 2-15 wt %, or 3-10 wt %. The direct reduced iron may be brought in contact with the dilute acid for a time period of 1-20 minutes, such as 2-15 minutes, or 3-10 minutes. The pH of the dilute acid may be 1-3, or 1-2.

The dissolved and/or suspended surface impurities of the direct reduced iron during the washing step may be removed by a separation step included in said washing step. The separation step may be selected from decantation, filtration, centrifugation, and any combination thereof.

The washing step may apart from dilute acid wash, and optional separation, include further washing(s) with water. The washed direct reduced iron may be further washed with water before the dissolution step. The washing with water may be performed using pure water, such as deionized water or distilled water.

Additives

The present purified iron containing aqueous solution may further be provided with a phosphate containing compound, and optionally a lithium containing compound, e.g. phosphoric acid, and lithium hydroxide, respectively. When the phosphate containing compound, and optionally lithium containing compound, e.g. phosphoric acid and lithium hydroxide, respectively, are mixed with the purified iron containing aqueous solution a simple mixture is provided. It is to be noted that no specific precipitation is initiated or formed, the components are simply coexisting in the aqueous solution mixture. Furthermore, an extra carbon source may optionally be added to the iron-containing aqueous solution.

Drying and Heat Treatments

The mixture comprising the purified iron containing aqueous solution, the phosphate containing compound, and optionally the lithium containing compound, e.g. phosphoric acid and lithium hydroxide, respectively, and optionally extra carbon source, may be subjected to a solidifying step to obtain an iron containing compound, or iron containing precursor. Said iron-containing compound, or iron-containing precursor, may optionally thus further contain phosphorous, and lithium. The iron-containing compound, or iron-containing precursor may in addition to phosphorous and lithium also contain an extra carbon source.

The solidifying step may be performed by drying, such as spray-drying, freeze drying or vacuum drying, the aqueous solution mixture to obtain an iron containing compound or iron containing precursor, more specifically an iron phosphate containing compound, preferably $FePO_4$, or a lithium iron phosphate containing compound, preferably $LiFePO_4$, depending on if lithium containing compound have been used in the process. The iron containing compound or precursor, more specifically the iron phosphate containing compound or precursor, or lithium iron phosphate containing compound or precursor, may be subjected to a heat treatment to obtain an iron containing compound, more specifically an iron phosphate containing compound or a lithium iron phosphate containing compound, depending on additions, which may be used for electrode material e.g. suitable for battery production. The iron containing compound, or iron containing precursor, when comprising both the phosphate containing compound, and the lithium containing compound, may be dried, and may thereafter be subjected to a heat treatment.

The heat treatment according to the present method may be performed at a temperature of 500-850° C., such as 600-700° C., to provide the iron containing compound, e.g. the iron phosphate compound or lithium iron phosphate compound. The iron containing compounds are obtained in an electrochemically active state and structure. Optionally, spray pyrolysis can be used, where the heat treatment is performed directly and continuously upon the spray drying step. Thus, spray pyrolysis is a combination of spray drying and heat treatment.

The iron containing compound, e.g. the iron phosphate compound or lithium iron phosphate compound may be carbon coated. Carbon coating is beneficial when used for battery production, e.g. lithium ion batteries.

One object of the present invention is to provide use of an iron containing compound, iron containing precursor, or iron containing aqueous solution obtained by the present method in lithium iron phosphate electrode material production, which may be used in Li-ion batteries.

One object of the present invention is to provide an iron containing aqueous solution, an iron containing composition, or iron containing precursor comprising:

at least 93 wt % iron, preferably at least 97.5 wt % iron, preferably at least 99%, preferably at least 99.5%, preferably at least 99.9%;

at most 60 ppm Al, preferably at most 40 ppm Al;

at most 160 ppm Ca, preferably at most 140 ppm Ca;

at most 80 ppm Mg, preferably at most 60 ppm Mg;

at most 160 ppm Mn, preferably at most 145 ppm Mn;

at most 100 ppm Si, preferably at most 90 ppm Si;

at most 40 ppm Ti, preferably at most 35 ppm Ti; and at most 80 ppm V, preferably at most 60 ppm V;

based on the total metal and semi-metal content therein originating from the direct reduced iron.

The present iron containing aqueous solution, an iron containing composition, or iron containing precursor comprises metals and semi-metals. They may comprise Al, Ca, Mg, Mn, Si, Ti, and V in an amount of at least 0.01 ppm, or at least 0.1 ppm, based on the total metal and semi-metal content therein originating from the direct reduced iron. The impurities comprising metals and semi-metals may be present in amounts of about: 0.01-60 ppm Al, such as 0.01-40 ppm or 0.1-40 ppm Al; 0.01-160 ppm Ca, such as 0.01-140 ppm or 0.1-140 ppm Ca; 0.01-80 ppm Mg, such as 0.01-60 ppm or 0.1-60 ppm Mg; 0.01-160 ppm Mn, such as 0.01-145 ppm or 0.1-145 ppm Mn; 0.01-100 ppm Si, such as 0.01-90 ppm or 0.1-90 ppm Si; 0.01-40 ppm Ti, such as 0.01-35 ppm or 0.1-35 ppm Ti; 0.01-80 ppm V, such as 0.01-60 ppm or 0.1-460 ppm; based on the total metal and semi-metal content therein originating from the direct reduced iron.

One object of the present invention is to provide an iron phosphate containing composition comprising said iron containing composition, or iron containing precursor, and phosphorous.

One object of the present invention is to provide a lithium iron phosphate electrode material comprising said iron containing composition, or iron containing precursor, phosphorous, and lithium. The lithium iron phosphate electrode material may further also contain an extra carbon source.

The lithium iron phosphate electrode material may be used for battery production.

In FIG. 1 there is provided a schematic drawing of the present process. In step 1, reduced iron powder is provided. In step 2, the process may optionally include washing the powder surfaces with dilute acid solution to remove soluble and/or dispersible impurities. In step 3, the reduced iron powder is dissolved in a solution containing organic and/or inorganic acid(s), optionally while providing molecular oxygen and/or hydrogen peroxide to the acid solution. In step 4, insoluble impurities are removed from the iron containing solution, e.g. by filtration. In step 5, the process may contain addition of phosphate containing compound, and optionally lithium containing compound. Further, a carbon source may be added. In step 6, the process may further comprise forming an iron containing precursor or iron containing compound by removal of solvent, e.g. by drying such as spray drying. In step 7, the process may further comprise heat treating the material provided with phosphate and lithium and optionally carbon containing compounds, to provide an iron containing compound.

EXAMPLES

Acidic Washing of Reduced Iron Powder

Washing tests were done to reduce the content of soluble and/or dispersible impurities attached to the surfaces of reduced iron powder (herein exemplified using the reduced iron powder NC100.24, obtainable from Höganäs AB). A kind of chemical slag removal is provided herein.

In one example, dilute phosphoric acid solution, being 8% in water, was used as a washing solution. 50 g of reduced iron provided as a powder was added to 450 g of said phosphoric acid solution, and subjected to stirring for 10 minutes. The solution was then removed from the powder by suction filtering, and 100 g of distilled water was added to the powder under continuous stirring. After 2 minutes, the water was removed by suction filtering, and again the powder sample was washed with water in a similar manner. Finally, the powder was removed, and dried under vacuum conditions at 80° C.

Samples of the reduced iron powder were taken for analysis with respect to impurities by performing elemental analysis using Inductively Conductive Plasma Optical Emission Spectroscopy (ICP-OES) and the test results are shown in Table 1. Sample no 4 discloses reduced iron powder (NC100.24) which is not subjected to any treatment according to the present invention (washing, dissolving, filtering), just as obtained reduced iron powder. Sample 7 discloses reduced iron powder which has been washed with dilute acid and water as explained above. It can be seen from the results of Table 1 that the contents of all the measured elements displayed in the table have decreased, especially the Ca content which has been reduced by 61%. This washing with dilute acid and water provides removal of soluble and/or dispersible impurities of the powder surface, i.e. present at the surfaces of the powder particles.

Dissolution and Filtering of Reduced Iron

Dissolution of the iron powder was accomplished by first preparing an acid solution containing citric acid and acetic acid with a molar ratio of 1:1, or 61.9 g of anhydrous citric acid and 21.5 g of glacial acetic acid in 560 ml of deionized water. 30 g of reduced iron powder (NC100.24, Höganäs AB) was added to the acid solution, and the solution was subjected to vigorous stirring. Oxygen was introduced into the solution by vigorous air bubbling. After stabilization of the temperature at around 20° C., 7.5 ml of hydrogen peroxide (conc. 33 wt % in water) was added to the solution in 3 steps; first addition was made 2 minutes from start, second addition was made 10 minutes after the first addition, and the third addition was made 10 minutes after the second addition. During the dissolution reaction, the pH of the solution showed a steady increase, from an initial pH 1.7 to a final pH 3.9, the latter at which the pH stabilized, indicating the completion of the dissolution reaction of the reduced iron powder. Also, the temperature increased from 20° C. to approximately 40° C. during the dissolution step. When the temperature starts to decrease it is an indication that the exothermic iron dissolution is not active any more. As all the iron has been dissolved the pH drops slowly and stabilizes at between 2.5 and 3.0. The decrease in pH indicate that the water-soluble iron-containing compound, also including any complexes, is changing character and stabilizes slowly. Visual inspection of the solution confirmed that all iron powder particles had been dissolved. The total time from the start of the dissolution process until all particles had been dissolved was approximately 150 minutes. Performing the dissolution at higher processing temperature may decrease the total time. Preferably, the temperature of the solution should not exceed 55° C.

The iron containing solution thus obtained was then transferred to a suction filtration unit, and filtered through a filter paper (Munktell Grade OOH with 1-2 µm openings).

The purified iron containing aqueous solution was further provided with 61.9 g orto-phosphoric acid (85%) and 22.5 g lithium hydroxide monohydrate. When the phosphate and lithium containing compound is mixed with the purified iron containing aqueous solution a dark green to black-reddish clear solution is provided, no specific precipitation is initiated or formed.

The filtered iron solution was thereafter spray-dried, and then the resulting spray-dried powder was heat treated for 3 hours at 750° C. in nitrogen atmosphere in order to pyrolyse and remove most of the carbon from the citric- and acetic acid used, in order to facilitate the ICP-OES analysis of the sample for determination of impurity content. The sample treated this way is sample no 9 of Table 1.

The same spray-drying and heat treatment procedure was used for two other solutions. One sample made from reduced iron powder that had not been washed with diluted acid and water before dissolution, and where the solution was not filtered before the spray-drying and heat treatment steps (Sample no 5). Another sample made from reduced iron powder which was washed with diluted phosphoric acid solution and water prior to dissolution, and where the resulting solution was not filtered prior to the spray-drying and heat treatment steps (Sample no 8).

A comparison between samples 5 and 8, of Table 1, show the effect of the washing of the reduced iron powder prior to dissolution on the impurity content. This can be compared with the results on unwashed and washed, undissolved reduced iron powders (i.e. samples 4 and 7, respectively), revealing similar trends.

Further improvements were made by filtering the solution obtained from dissolution of washed reduced iron powder, in Table 1 shown as sample 9. In this case, the impurity content is close to, or below the detection limit of the ICP-OES analysis instrument for three of the reported impurities. In the case of Ca containing impurities the content has been reduced by 840%, or to $1/8^{th}$ of its original content. It is, thus, clear that the combination of dilute acid washing of reduced iron powder combined with dissolution in acidic solution and subsequent filtration is a very efficient method to provide iron containing solutions of high purity at low cost, as well as high purity or pure iron containing compounds and iron containing precursors of high purity at low cost. A comparison between samples 6 and 9, of Table 1, show the effect of the washing of the reduced iron powder prior to dissolution on the impurity content. In contrast to samples 5 and 8, samples 6 and 9 were filtered before the spray-drying and heat treatment steps.

Dissolution and Filtering of Iron Ore

As a comparative example, a powder sample of iron ore, magnetite (mainly $Fe_3O_4$), was dissolved in hydrochloric acid (HCl). To facilitate comparison, the magnetite used in the tests was of similar type as the raw material used for the production of the reduced iron in the other examples. The acidic washing step was omitted from these tests as the $Fe_3O_4$ had already been subject to a water based washing treatment during its production.

A solution 10 g of 37% HCl and 2.7 g of distilled water were mixed in a beaker and 1.0 g of magnetite was added during vigorous stirring. The solution was maintained at 70° C. throughout the dissolution process. After 60 min, when the sample had been completely dissolved, the resulting iron containing solution was subject to filtering to remove any insoluble impurities. For additional comparison, a similar sample was prepared, but without the final filtering stage. Finally, both the undissolved magnetite (sample 1 of Table 1), the dissolved and unfiltered magnetite (sample 2), and dissolved and filtered magnetite (sample 3) were analyzed for impurity content using ICP-OES. From the results it can be seen that the dissolution process does not significantly influence the impurity content. Also, filtering the solution after dissolution only marginally reduces the impurity content, in some cases even leaving the impurity content unchanged. This implies that in the iron ore the impurities are in such a state that they do not form solid particles during the dissolution, making them difficult or even impossible to remove using the proposed method.

Dissolution and Filtering of Water Atomized Iron Powder

For the purpose of comparison, samples of atomized iron powders were subject to similar treatment as in the present invention. Both a first commercially available water atomized iron powder (sample 12 and 13) (AHC100.29, Höganäs AB), as well as a second commercially available water atomized iron powder (sample 10 and 11) (ABC100.30, Höganäs AB), a water atomized iron powder of higher purity, were tested. In addition a commersially available LFP material (produced in Taiwan) was tested (sample 14), which is to represent materials available and accepted by the industry. Atomized iron powders provide more dense particles compared to reduced iron particles. Also, the atomized iron powders run a higher risk of passivity of the powder upon dissolution in acid. These powders are not believed to have the impurities provided at the surface of the particles or included as clusters within the iron structure. It is believed the impurities are more distributed at grain boundaries and even incorporated into the iron crystal structure. Thus, atomized powders are often more difficult to wash and/or dissolve and also more costly as raw materials for the production of high purity products.

TABLE 1

| No. | Sample | Selected impurity elements (ppm) | | | | | | |
|---|---|---|---|---|---|---|---|---|
| | | Al | Ca | Mg | Mn | Si | Ti | V |
| 1 | Magnetite ore (mainly $Fe_3O_4$) | 1310 | 320 | 1370 | 620 | 730 | 1660 | 1670 |
| 2 | Dissolved and unfiltered magnetite | 1270 | 260 | 1380 | 640 | 610 | 1800 | 1660 |
| 3 | Dissolved and filtered magnetite | 750 | 220 | 1130 | 580 | 210 | 1110 | 1640 |
| 4 | Reduced iron powder (NC100.24) | 640 | 1100 | 650 | 270 | 530 | 910 | 720 |
| 5 | Dissolved reduced iron powder (NC100.24), unfiltered as iron solution | 330 | 1020 | 450 | 210 | 350 | 390 | 410 |
| 6 | Dissolved reduced iron powder (NC100.24), filtered as iron solution | 90 | 830 | 270 | <140 | 300 | 40 | 90 |
| 7 | Washed reduced iron powder (NC100.24) | 500 | 420 | 460 | 220 | 230 | 810 | 640 |

TABLE 1-continued

| No. | Sample | Selected impurity elements (ppm) | | | | | | |
|---|---|---|---|---|---|---|---|---|
| | | Al | Ca | Mg | Mn | Si | Ti | V |
| 8 | Washed and dissolved reduced iron powder (NC100.24), unfiltered as iron solution | 250 | 320 | 230 | <140 | <90 | 330 | 340 |
| 9 | Washed and dissolved reduced iron powder (NC100.24), filtered as iron solution | 30 | 120 | 50 | <140 | <90 | <30 | 40 |
| 10 | Atomized and dissolved iron powder (ABC100.30), unfiltered as iron solution | 20 | 140 | <30 | 470 | <90 | <30 | <30 |
| 11 | Atomized and dissolved iron powder (ABC100.30), filtered as iron solution | 20 | 80 | <30 | 420 | <90 | <30 | <30 |
| 12 | Atomized and dissolved iron powder (AHC100.29), unfiltered as iron solution | 20 | 90 | <30 | 1940 | <90 | <30 | <30 |
| 13 | Atomized and dissolved iron powder (AHC100.29), filtered as iron solution | 20 | 80 | <30 | 1770 | <90 | <30 | <30 |
| 14 | LFP* Commercial Grade | 220 | 250 | 80 | <140 | <90 | 3410 | <30 |

**Values "<" are below detection limit
Samples 1-3: Values related to Fe-content in magnetite ore ($Fe_3O_4$).
Samples 4 and 7: Values related to Fe-content in Fe-powder.
Samples 5-6 and 8-13: Values related to Fe-content in $LiFePO_4$ (LFP) and correlated in view of the content of iron.

Using direct reduced iron is of importance to the present method. When comparing the material to tests made with atomized iron powder, the atomized iron powders have much higher contents of impurities containing metals which are more electronegative than iron, previously disclosed as group 4, see table 2 (Co, Cu, and Ni). The atomized powders also show considerably higher contents of impurities in view of Mn (see table 1) and Cr (see table 2). In the present process these impurities are soluble, and may be found in the aqueous phase after the present dissolution process. Thus, there is no gain in using atomized iron powders.

TABLE 2

| No. | Sample | Selected impurity elements (ppm) | | | |
|---|---|---|---|---|---|
| | | Co | Ni | Cu | Cr |
| 12 | Atomized and dissolved iron powder (AHC100.29), unfiltered as iron solution | 90 | 550 | 860 | 810 |
| 13 | Atomized and dissolved iron powder (AHC100.29), filtered as iron solution | 90 | 550 | 830 | 750 |

TABLE 2-continued

| No. | Sample | Selected impurity elements (ppm) | | | |
|---|---|---|---|---|---|
| | | Co | Ni | Cu | Cr |
| 5 | Dissolved reduced iron powder (NC100.24), unfiltered as iron solution | 150 | 230 | <60 | 80 |
| 6 | Dissolved reduced iron powder (NC100.24), filtered as iron solution | 150 | 230 | <60 | 80 |
| 8 | Washed and dissolved reduced iron powder (NC100.24), unfiltered as iron solution | 150 | 220 | <60 | 30 |
| 9 | Washed and dissolved reduced iron powder (NC100.24), filtered as iron solution | 150 | 150 | <60 | 30 |

**Values "<" are below detection limit
Samples 5-6, 8-9, and 12-13: Values related to Fe-content in LiFePO4 (LFP) and correlated in view of the content of iron.

The invention claimed is:

1. A method of producing an iron containing compound, iron containing precursor, or iron containing aqueous solution comprising the steps of:
providing direct reduced iron produced by direct reduction of iron ore to iron by a reducing gas or elemental carbon;
dissolving the direct reduced iron in a solution comprising at least one organic acid and, optionally, an inorganic acid to provide an iron containing aqueous solution, wherein the pH of the iron containing aqueous solution after dissolution is at most 4.5, and wherein insoluble impurities of the direct reduced iron are maintained in solid form throughout the dissolution process, to obtain an iron containing aqueous solution with suspended insoluble impurities;
separating the said insoluble impurities from the iron containing aqueous solution obtaining a purified iron containing aqueous solution; and
optionally, solidifying said purified iron containing aqueous solution to provide the iron containing compound or iron containing precursor, by drying.

2. The method according to claim 1, wherein the organic acid is selected from the group consisting of citric acid, formic acid, acetic acid, propionic acid, oxalic acid, benzoic acid, glycolic acid, lactic acid, malic acid, tartaric acid, and any combination thereof.

3. The method according to claim 1, wherein the solution further comprises the inorganic acid, wherein the inorganic acid is selected from the group consisting of hydrochloric acid, chloric acid, perchloric acid, sulfuric acid, sulfurous acid, nitric acid, nitrous acid, phosphoric acid, and any combination thereof.

4. The method according to claim 1, wherein the pH of the iron containing solution after dissolution is at most 4.0.

5. The method according to claim 1, wherein the direct reduced iron is brought in contact with the solution for a time period of about 30 minutes to 5 hours.

6. The method according to claim 1, wherein the temperature during the dissolution step is about 25-100° C.

7. The method according to claim 1, wherein the separation is performed using decanting, sedimentation, filtration, centrifugation, floatation, or any combination thereof.

8. The method according to claim 1, wherein the purified iron containing aqueous solution, iron containing compound, or iron containing precursor provided has an iron content of at least 93 wt %, based on the total metal and semi-metal content therein, which metals and semi-metals originates from the direct reduced iron.

9. The method according to claim 1, wherein the purified iron containing aqueous solution, iron containing compound, or iron containing precursor provided contains insoluble impurities in an amount of:
≤1000 ppm, based on the total metal and semi-metal content therein originating from the direct reduced iron.

10. The method according to claim 1, wherein said insoluble impurities comprises aluminium, arsenic, bismuth, calcium, chromium, iron, lead, magnesium, manganese, molybdenum, selenium, niobium, antimony, silicon, tantalum, titanium, tungsten, vanadium, zinc, zirconium, carbon, nitrogen, oxygen, phosphorous, sulfur, or any combination thereof.

11. The method according to claim 1, wherein oxygen is provided to said dissolution step.

12. The method according to claim 1, wherein an oxidizing agent is added to said dissolution step.

13. The method according to claim 1, wherein the direct reduced iron prior to the dissolution step is subjected to a washing step, wherein soluble and/or dispersible surface impurities of the direct reduced iron are dissolved and/or suspended, and removed.

14. The method according to claim 13 wherein the washing step includes subjecting the direct reduced iron to a dilute acid.

15. The method according to claim 14, wherein the dilute acid is a dilute organic acid selected from the group consisting of citric acid, formic acid, acetic acid, propionic acid, oxalic acid, benzoic acid, glycolic acid, lactic acid, malic acid, tartaric acid, and any combination thereof.

16. The method according to claim 14, wherein the dilute acid is a dilute inorganic acid selected from the group consisting of hydrochloric acid, hydrofluoric acid, chloric acid, perchloric acid, sulfuric acid, sulfurous acid, nitric acid, nitrous acid, phosphoric acid, and any combination thereof.

17. The method according to claim 14 wherein the dilute acid provided has a concentration of 1-25 wt %.

18. The method according to claim 14, wherein the direct reduced iron is brought in contact with the dilute acid for a time period of 1-20 minutes.

19. The method according to claim 14, wherein the pH of the dilute acid is 1-3.

20. The method according to claim 13, wherein the washing step further includes a separation step, to remove the dissolved and/or suspended surface impurities of the direct reduced iron.

21. The method according to claim 13, wherein the washing step further includes washing with water, wherein the direct reduced iron washed with dilute acid and optionally separated is further washed with water before dissolution.

22. The method according to claim 1, wherein the dissolution step is provided with means of temperature control.

23. The method according to claim 1, wherein the purified iron containing aqueous solution is mixed with a phosphate containing compound, and optionally a lithium containing compound and then subjected to the solidifying step by drying to provide said iron containing compound, or iron containing precursor.

24. The method according to claim 23, wherein said dried iron containing compound, or iron containing precursor, comprising the phosphate containing compound, and optionally the lithium containing compound, is subjected to a heat treatment at a temperature of 500-850° C.

25. The method according to claim 11, wherein an oxidizing agent is added to said dissolution step.

26. The method according to claim 1, wherein the organic acid comprises a combination of citric acid and acetic acid.

* * * * *